US011688367B2

(12) United States Patent
Choi et al.

(10) Patent No.: US 11,688,367 B2
(45) Date of Patent: Jun. 27, 2023

(54) VARYING DISPLAY REFRESH RATE

(71) Applicant: Google LLC, Mountain View, CA (US)

(72) Inventors: Wonjae Choi, San Jose, CA (US);
Daniel Solomon, San Jose, CA (US);
John Kaehler, Mountain View, CA (US)

(73) Assignee: Google LLC, Mountain View, CA (US)

( * ) Notice: Subject to any disclaimer, the term of this patent is extended or adjusted under 35 U.S.C. 154(b) by 3 days.

(21) Appl. No.: 17/379,371

(22) Filed: Jul. 19, 2021

(65) Prior Publication Data
US 2021/0350771 A1    Nov. 11, 2021

Related U.S. Application Data

(63) Continuation of application No. 16/545,663, filed on Aug. 20, 2019, now Pat. No. 11,094,296.
(Continued)

(51) Int. Cl.
*G09G 5/395*     (2006.01)
*G09G 3/36*      (2006.01)
(Continued)

(52) U.S. Cl.
CPC .............. *G09G 5/395* (2013.01); *G06T 1/60* (2013.01); *G09G 3/3611* (2013.01); *G09G 5/18* (2013.01);
(Continued)

(58) Field of Classification Search
None
See application file for complete search history.

(56) References Cited

U.S. PATENT DOCUMENTS 6,147,695 A    11/2000 Bowen et al.
9,240,031 B1    1/2016 Wang
(Continued)

FOREIGN PATENT DOCUMENTS

CN    104714799    6/2015
CN    107430629    12/2017
(Continued)

OTHER PUBLICATIONS

EP Office Action in European Application No. 19773597.0, dated Jan. 26, 2022, 13 pages.
(Continued)

*Primary Examiner* — Joni Hsu
(74) *Attorney, Agent, or Firm* — Fish & Richardson P.C.

(57) ABSTRACT

Methods, systems, and apparatus, including computer programs encoded on computer storage media, for enabling a variable refresh rate on a display. One of the methods includes receiving, from a content presentation device, a first signal set to a first value; completing generation of first visual content; and after completing the generation of the first visual content, determining that the first signal is set to the first value and a second threshold duration of time has not expired; sending, to the content presentation device, the first visual content, wherein sending the first visual content causes the content presentation device to change the first signal from the first value to the second value; and after sending the first visual content, receiving, from the content presentation device, the first signal set to the second value.

21 Claims, 6 Drawing Sheets

Related U.S. Application Data

(60) Provisional application No. 62/775,539, filed on Dec. 5, 2018.

(51) Int. Cl.
*G06T 1/60* (2006.01)
*G09G 5/18* (2006.01)

(52) U.S. Cl.
CPC ..... *G09G 2310/08* (2013.01); *G09G 2360/18* (2013.01)

(56) References Cited

U.S. PATENT DOCUMENTS

| | | |
|---|---|---|
| 9,728,166 B2 | 8/2017 | Law et al. |
| 2013/0262783 A1 | 10/2013 | Okada et al. |
| 2014/0022185 A1* | 1/2014 | Ribeiro ............... G06F 3/017 345/173 |
| 2015/0145875 A1 | 5/2015 | Pangam et al. |
| 2016/0063939 A1 | 3/2016 | Lee et al. |
| 2016/0078851 A1 | 3/2016 | Asai |
| 2017/0047027 A1 | 2/2017 | Nambi et al. |
| 2017/0103704 A1 | 4/2017 | Kimura |
| 2017/0193971 A1* | 7/2017 | Bi ........................ G09G 5/18 |
| 2017/0295343 A1 | 10/2017 | Konishi et al. |
| 2017/0316734 A1* | 11/2017 | Asai ..................... G09G 5/395 |
| 2018/0158424 A1 | 6/2018 | Okamoto et al. |
| 2019/0164518 A1 | 5/2019 | Dimitrov |
| 2019/0244579 A1 | 8/2019 | Oh et al. |

FOREIGN PATENT DOCUMENTS

| | | |
|---|---|---|
| CN | 107564494 | 1/2018 |
| CN | 108710479 | 10/2018 |
| TW | 201621808 | 6/2016 |
| TW | 201729176 | 8/2017 |

OTHER PUBLICATIONS

CN Office Action in Chinese Application No. 201980044301.5, dated Dec. 14, 2021, 10 pages (with English translation).

PCT International Search Report and Written Opinion in International Appln. No. PCT/US2019/049895, dated Dec. 20, 2019, 20 pages.

qualcomm.com [online], "Razer phone taps snapdragon 835 for unparalleled mobile gaming experience," Nov. 1, 2017, [retrieved Jan. 7, 2019], retrieved from : URL<https://www.qualcomm.com/news/onq/2017/ll/01/razer-phone-taps-snapdragon-835-unparalleled-mobile-gaming-experiences>, 4 pages.

qualcomm.com [online], "Snapdragon 835: Powering the immersive VR and AR experiences you've been waiting for," Jan. 24, 2017, [retrieved on Jan. 7, 2019] retrieved from: URL< https://www.qualcomm.com/news/onq/2017/01/24/snapdragon-835-powering-immersive-vr-and-ar-experiences-youve-been-waiting>, 7 pages.

TW Office Action in Taiwanese Application No. 108134760, dated May 11, 2020, 7 pages (with English translation).

wikipedia.com [online], "FreeSync", Jan. 1, 2019, [retrieved on Jan. 7, 2019], retrieved from URL<https://en.wikipedia.org/wiki/FreeSync>, 16 pages.

wikipedia.com [online], "Nvidia G-Sync", Dec. 30, 2018, [retrieved on Jan. 7, 2019], retrieved from: URL< https://en.wikipedia.org/wiki/Nvidia_G-Sync, 10 pages.

* cited by examiner

VARYING DISPLAY REFRESH RATE

CROSS-REFERENCE TO RELATED APPLICATION

This patent application is a continuation (and claims the benefit of priority under 35 U.S.C. § 120) of U.S. patent application Ser. No. 16/545,663, filed Aug. 20, 2019, now U.S. Pat. No. 11,094,296, which claims the benefit of U.S. Provisional Application No. 62/775,539, filed on Dec. 5, 2018, the contents of which are incorporated by reference herein.

TECHNICAL FIELD

This specification generally relates to electronic device displays.

BACKGROUND

Computing devices may include displays on which visual content may be shown. For example, a user of a computing device may view visual content stored in a photo album on the computing device, may view visual content that was just captured using a camera attached to the computing device, or may view visual content from an internet website.

SUMMARY

This specification describes techniques, methods, systems, and other approaches for implementing variable refresh rate ("VRR") for electronic device displays.

To achieve improved performance when applying VRR to electronic device displays, a display can vary its refresh rate in order to synchronize the refresh rate with a rate at which it receives visual content. Visual content can be, for example, a frame in a video stream. The display can vary its refresh rate between a maximum and a minimum refresh rate, e.g., determined based on hardware properties, software properties, or both, of the display. Varying display refresh rate can reduce visual corruption, discontinuities in animation, or both, in visual content presentation.

A visual content system can include a content generation device, such as a system-on-chip ("SoC"), and a content presentation device, such as a display driver integrated circuit ("DDIC"). The content generation device generates visual content and sends it to a buffer within the content presentation device. The content presentation device reads the visual content from the buffer and displays the visual content on a panel.

When the content presentation device has completed reading the content from the buffer, the content presentation device asserts a first signal, such as a tearing effect ("TE") signal, to the content generation device to indicate that the content presentation device is ready to receive additional content, e.g., that the content generation device may send additional visual content to the buffer. To assert the TE signal, for example, the content presentation device can set the TE signal to a first value, which may be a value of one. To deassert the TE signal, the content presentation device can set the TE signal to a second value, which may be a value of zero. To vary display refresh rate, the content presentation device can vary a length of time when the TE signal is asserted.

Varying the TE signal length can enable the content generation device to send visual content to the buffer for reading by the content presentation device more quickly after the content generation device generates the visual content, e.g., compared to other systems. This can reduce a delay in the time between when the content presentation device presents images on a display, between presentation of subsequent frames in a video stream, e.g., a dynamically generated video stream, or both.

When the content generation device sends visual content to the buffer, the content generation device can send a message to the content presentation device that indicates that the content generation device is placing the visual content in the buffer. The content generation device can send the message, such as a write_memory_start command, to the content presentation device before sending the visual content to the buffer. The signal indicates the start of visual content, and can trigger the start of a new refresh cycle in the content presentation device.

In some implementations, the content generation device can send a write_memory_start message without visual content. This can trigger the content presentation device to start a new refresh cycle using visual content previously sent to the buffer. When the content presentation device begins a new refresh cycle, the content presentation device can deassert the signal, e.g., change the signal from a value of one to a value of zero.

In some implementations, the content generation device can send visual content to the buffer when the TE signal is not asserted, for example, when the TE signal has a value of zero, as long as sending the visual content does not interfere with the content presentation device reading from the buffer. This enables the latest available visual content to display as soon as possible.

In a display system that uses emission pulses at regular rates, such as an organic light emitting diode (OLED), the content presentation device can delay a refresh cycle until an ongoing emission pulse ends. This synchronizes the refresh rate with the emission pulses in order to maintain consistent luminance of the display.

The subject matter described in this specification can be implemented in various embodiments and may result in one or more of the following advantages. In some implementations, varying display refresh rate may result in visual content being presented on a display more quickly than systems or methods that do not vary the display refresh rate, e.g., may result in visual content being presented on a display as soon as possible following the visual content generation. Varying a display refresh rate can result in reduced latency between the creation of the visual content and the presentation of the visual content. For example, in a virtual augmented environment, varying a display refresh rate can reduce the motion-to-photon latency, e.g., the length of time needed for a user's movement to be reflected on a display. In an example system that uses a touch screen display, varying the display refresh rate can reduce touch screen latency, e.g., the time between a user touching the display and the display presenting feedback in response to the user's touch.

In some implementations, varying a display refresh rate can reduce the power consumption of a content presentation device. For example, the content presentation device may delay a refresh cycle, e.g., and maintain the TE asserted, while a content generation device completes the generation of visual content. This can enable the content presentation device to use a slower refresh rate. A slower refresh rate can result in decreased power consumption by the content presentation device.

In some implementations, varying display refresh rate can improve a visual quality of the visual content presented on the display by reducing or eliminating desynchronizations between display and content, or "jank". Jank may be caused when variable frame rate content is forced into an unintended cadence by the display. By delaying a refresh cycle until a content generation device completes the generation of visual content, jank and other visual corruptions can be reduced.

In general, one innovative aspect of the subject matter described in this specification can be embodied in methods that include the actions of receiving, from a content presentation device, a first signal set to a first value i) for at least a first threshold duration of time and ii) for at most a second threshold duration of time or changing to a second value that is different from the first value when the system sends visual content to the content presentation device, the first value indicates that the system can send visual content to a buffer included in the content presentation device, the first threshold duration of time is shorter than the second threshold duration of time; while the first signal is set to the first value and after the first threshold duration of time since receiving the first signal set to the first value: completing generation of first visual content; and after completing the generation of the first visual content, determining that the first signal is set to the first value and the second threshold duration of time has not expired; in response to determining that the first signal is set to the first value and the second threshold duration of time has not expired, sending, to the content presentation device, the first visual content, wherein sending the first visual content causes the content presentation device to change the first signal from the first value to the second value; and after sending the first visual content, receiving, from the content presentation device, the first signal set to the second value. Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include, for second visual content: determining that a time period for generating second visual content is greater than the second threshold duration of time, and in response to determining that the time period for generating second visual content is greater than the second threshold duration of time, sending, to the content presentation device, a message that causes the content presentation device to read visual content stored in the buffer and present, using the read visual content, an image on a display.

In some implementations, the method may include, after sending the message, completing generation of data for the second visual content, determining that at least a threshold amount of time has passed since sending the message, and in response to determining that at least a threshold amount of time has passed since sending the message and completing generation of data for the second visual content, sending, to the content presentation device, the second visual content.

In some implementations, the method may include, for second visual content: determining that the first signal is set to the second value; determining that the content presentation device is not accessing or about to access the buffer; and in response to determining that the first signal is set to the second value and determining that the content presentation device is not accessing or about to access the buffer, sending to the content presentation device, the second visual content.

In some implementations, the visual content represents a frame in a video stream.

In some implementations, the method may include; for second visual content: receiving, from the content presentation device, the first signal set to the first value indicating that the system can send visual content to the buffer included in the content presentation device. The method may include, while the first signal is set to the first value, generating data for the second visual content, after generating the data, receiving, from the content presentation device, the first signal set to a second value indicating that the system should not send visual content to the buffer, determining that the first signal is set to the second value, and completing generation of the second visual content. In response to determining that the first signal is set to the second value and completing generation of the second visual content, the method may include determining to wait to send the second visual content to the content presentation device.

In some implementations, determining to wait to send the second visual content to the content presentation device may include determining to wait until the first signal is set to the first value to send a second visual content. The method may include, in response to the first signal being set to the first value and after determining to wait until the first signal is set to the first value to send a second visual content, sending, to the content presentation device, the second visual content.

In some implementations, determining to wait to send the second visual content to the content presentation device may include determining to wait until a determination that the content presentation device is not accessing or about to access the buffer to send the second visual content. The method may include, in response to determining that the content presentation device is not accessing or about to access the buffer and after determining to wait until a determination that the content presentation device is not accessing or about to access the buffer to send the second visual content, sending, to the content presentation device, the second visual content.

In some implementations, the first value may indicate that the first signal is asserted.

In some implementations, the method may include, for the first visual content: completing generation of the first visual content during a first emission pulse of a display presenting a first image. The method may include sending, to the content presentation device and prior to a second emission pulse of the display, the first visual content of a second image for presentation on the display concurrently with the second emission pulse of the display. The second emission pulse may occur at a predetermined time interval after the first emission pulse, and the second image may be a different image than the first image.

In some implementations, the predetermined time interval is not greater than one millisecond in duration.

In some implementations, sending, to the content presentation device, the first visual content causes the content presentation device to wait for the second emission pulse to present the second image on the display and does not change the predetermined time interval between the first emission pulse and the second emission pulse.

In some implementations, the second threshold duration of time is based on a minimum refresh rate of a display that uses the first visual content to present an image.

In some implementations, the method may include generating first data for the first visual content, the first visual content including the first data and second data. The method may include receiving the first signal set to the first value occurs after generating the first data. Completing the generation of the first visual content may include generating the second data for the first visual content. Sending the first visual content may include sending, to the content presentation device, the first visual content including the first data and the second data.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
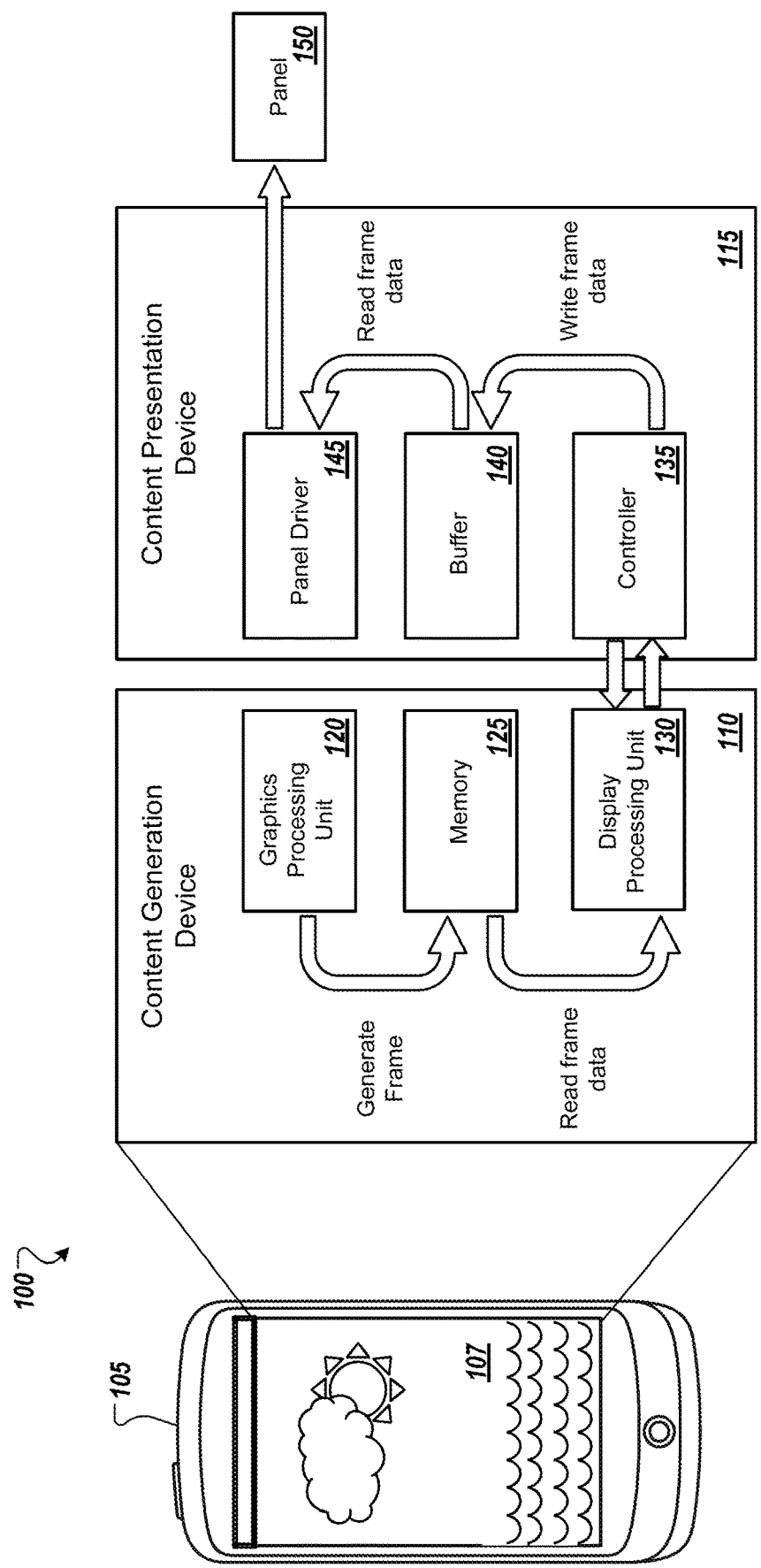
FIG. 1 is an illustration of an example environment in which visual content can be stored in a buffer after a first threshold period of time has passed.

Displays of electronic devices are frequently used to show video content. For example, a user of a computing device may view a video stored in a photo album on the computing device, may view video that was captured using a camera attached to the computing device, or may view video from an internet website.

In some cases, a computing device display refreshes an image at fixed rates. The frame rate of the provided video content may vary. When the video content frame rate can consistently keep up, e.g., is the same as or greater than or either, with computing device display refresh rate, the content is shown as intended.

In some cases, a display refresh rate and video content frame rate may not match, and the visual quality of the video content suffers. Desynchronization between display and content can be perceived by users as visual corruption or discontinuities in animation. Some forms of desynchronizations between display and content can include "tearing", "jank", or "stutter". These desynchronizations may be caused when variable frame rate content is forced into an unintended cadence by the display.

To enhance in video content display, a computing device may use variable refresh rate ("VRR") technology which synchronizes displays to content. In some implementations, VRR solutions can synchronize to display vertical synchronization ("Vsync") when content frame rate exceeds display refresh rate, e.g., to prevent tearing.

In some implementations, VRR technology can stretch display refresh cycles when content frame rate drops below display refresh rate. Stretching display refresh cycles can reduce or eliminate delay between when a content frame is ready to be shown and when the content frame is actually shown; reduce or eliminate stutter; or both.

VRR technology may be used for display serial interface ("DSI") displays, such as those found in mobile computing devices. When implementing VRR with a DSI display, a system can synchronize device display refresh rate and video content frame rate using a content generation device and a content presentation device.

Organic light-emitting diode ("OLED") displays may be used in mobile computing devices. OLED displays illuminate individual pixels by emitting emission pulses at a regular rate. When VRR technology is applied to OLED displays, fluctuations in display brightness may occur, e.g., if VRR techniques adjust the emission pulse rate.

The TE signal can be a short pulse, e.g., can assert or have a value of one for a short period of time. The TE signal can indicate that it is safe for the content generation device to write to a buffer. The content presentation device normally starts a refresh cycle, i.e., to begin reading from the buffer, within a few frame lines worth of time after the TE signal deasserts (TE offset). For example, the content presentation device may start a refresh cycle within a few hundred microseconds after the TE signal deasserts. In some implementations, the content presentation device can keep the TE signal asserted throughout the entire period when it is stretching the current refresh cycle, i.e., delaying the next refresh cycle. During this time, the content generation device may write to the buffer normally. When the content generation device begins writing to the buffer, the content presentation device can deassert the TE signal, wait for TE offset, and begin a refresh cycle.

The content generation device can send a write_memory_start command at the start of a frame. This command can be followed by pixel data. In some implementations, as long as TE signal is asserted, the content generation device may send a write_memory_start command without any pixel data, e.g., as a dummy command. This dummy command can serve as a signal to the content presentation device to begin a normal refresh cycle. The content generation device can use the dummy command to force the content presentation device to scan out the current buffer contents, even if the content generation device is not ready to send new data.

The content generation device can write to the buffer when the content presentation device asserts the TE signal. To improve upon other systems that use VRR with OLED displays, the content generation device may write to the buffer even when TE deasserts. The content generation device can monitor the write speed for writing content into the buffer such that writing content to the buffer does not overtake the content presentation device's read location and cause tearing.

FIG. 1 is an illustration of an example environment 100 in which visual content can be stored in a buffer after a first threshold period of time has passed. The example environment 100 includes a device 105 such as a mobile device. The device 105 may also be, for example, a tablet, head mounted display, smart watch, or television. The device 105 includes a content generation device 110, e.g., a system on a chip, a content presentation device 115, e.g., a display driver integrated circuit, and a panel 150. The content generation device 110 can include a graphics processing unit 120, memory 125, a display processing unit 130, or a combination of two or more of these. The content presentation device 115 can include a controller 135, a buffer 140, a panel driver 145, or a combination of two or more of these.

When generating and displaying video images 107 on the panel 150 of the device 105, the graphics processing unit 120 can generate visual content data, such as a frame of a video. The visual content data may be for a video sequence that is pre-rendered, e.g., for a film. The visual content data may be for a video sequence that is dynamically generated, e.g., for a video game. In some examples, the visual content data can be compressed, using any appropriate method. In some examples, the visual content data can be uncompressed. The graphics processing unit 120 stores the generated visual content data in the memory 125 within the content generation device 110. The memory 125 may be any appropriate type of memory. For instance, the memory 125 can be a random access memory ("RAM").

The display processing unit 130 can read the visual content data from the memory 125. Once the display processing unit 130 reads the visual content data from the memory 125, the content generation device 110 is ready to send the visual content data to the content presentation device 115.

The controller 135 within the content presentation device 115 sends a signal, e.g., a TE signal, to the display processing unit 130 that indicates that the content generation device 110 is permitted to send data to the content presentation device 115. The signal can be a continuous signal that changes value to indicate that the content generation device 110 is permitted to send data to the content presentation device 115. For example, the controller 135 can assert the signal, e.g., by changing the signal from a value of zero to a value of one, to indicate that the content generation device 110 is permitted to send data to the content presentation device 115. The signal can be intermittent. For instance, the controller 135 can send a fixed length signal, e.g., that has a value of one, to the display processing unit 130 to indicate that the content generation device 110 is permitted to send data to the content presentation device 115.

The signals described in this document can be any appropriate type, have any appropriate value, or both. For instance, the TE signal may be represented by a binary signal. In some examples, the TE signal can be represented by a voltage. When the TE signal is represented by a voltage, the TE signal can have a high value to indicate that the TE signal is asserted and a low value to indicate that the TE signal is deasserted. In some examples, the TE signal can have a low value to indicate that the TE signal is asserted and a high value to indicate that the TE signal is deasserted.

When the content generation device 110 receives the signal, the display processing unit 130 determines that the content generation device 110 can send the visual content data to the content presentation device 115. The display processing unit 130 can then send the visual content data to the controller 135 over a connection. The connection can be any appropriate type of connection. For instance, the connection may include one or more computer buses in the device 105 that connect the content generation device 110 and the content presentation device 115. In some examples, the connection may include one or more cables, e.g., a display cable.

In some implementations, the device 105 can vary refresh cycle lengths according to a duration of time it takes to generate content. Display refresh cycles can be stretched, e.g., particular visual content can be presented for a longer prior of time, when the visual content data rate drops below the display refresh rate. To stretch the refresh cycle, the controller 135 can assert the TE signal for a variable duration of time between a first threshold and a second threshold duration of time, or until the display processing unit 130 begins to send the visual content data to the controller 135. When the display processing unit 130 begins to send the visual content data to the controller 135, or when the TE signal reaches the second threshold duration of time, the controller 135 deasserts the TE signal, e.g., by changing the signal from a value of one to a value of zero. In some examples, the controller 135 can deassert the TE signal by stopping transmission of the TE signal to the content generation device 110.

The second threshold duration of time can be based on a minimum refresh rate of a display that uses visual content to present an image. For example, the second threshold can be less than a time interval between frames presented at the lowest refresh rate of the display.

Stretching the refresh cycle lengths can result in shorter or no delay between when visual content data is ready to be shown and when it is actually shown on the panel 150. This can reduce or eliminate stutter, reduce input latency, or both.

The controller 135 can write the visual content data to the buffer 140. The buffer 140 temporarily stores the visual content data, e.g., the buffer 140 can be a local frame buffer for the content presentation device 115. The panel driver 145 reads the visual content data from the buffer 140 and presents the visual content data as an image on the panel 150. Presentation of a sequence of the visual content data, e.g., a sequence of frames, on the panel 150 causes presentation of a video.

While the panel driver 145 is reading a first frame from the buffer 140, typically it is not safe for the content generation device 110 to send a second frame to the controller 135. For example, if the content generation device 110 sends the second frame to the controller 135 while the panel driver 145 is reading the first frame from the buffer 140, it can cause errors and data corruption, e.g., in the data sent to the panel 150. Because of this, the controller 135 waits for the panel driver 145 to complete reading the first frame from the buffer 140 before sending the signal to the display processing unit 130 that indicates that the content generation device 110 is permitted to send the second frame to the content presentation device 115.

The device 105 may include a personal computer, a mobile communication device, and other devices that can send and receive data over a network. The device 105 can include several different functional components, including a content generation device 110, a content presentation device 115, and a panel 150. The various functional components of the device 105 may be installed on one or more computers as separate functional components or as different modules of a same functional component. For example, the content generation device 110 and content presentation device 115 of the device 105 can be implemented as hardware components, computer programs, or a combination of both, installed on one or more computers in one or more locations that are coupled to each through a network. In some examples, the content generation device 110 can be included in a video card. In some examples, the content presentation device 115 can be included in a display device that also includes the panel 150, e.g., an OLED display.

Figure 2:
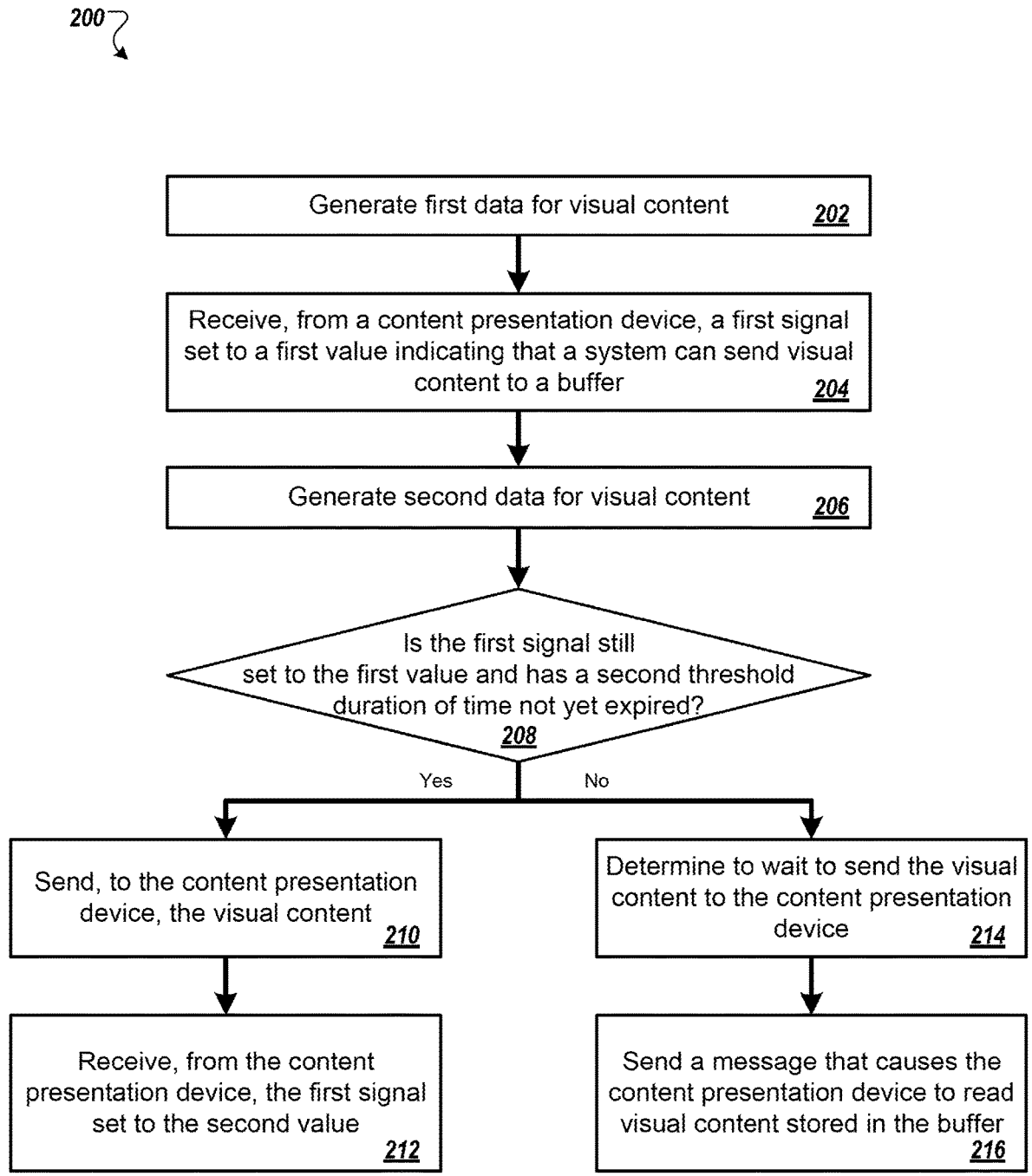
FIG. 2 is a flow diagram of a process for determining when to send visual content to a content presentation device.

FIG. 2 is a flow diagram of a process 200 for determining when to send visual content to a content presentation device. For example, the process 200 can be used by the content generation device 110 from the environment 100.

A content generation device generates first data for visual content (202). The visual content can be, for example, a frame of a video sequence, e.g., an image. The content generation device can generate the first data for visual content using any appropriate method. For instance, a graphics card, as the content generation device, can receive data that represents a virtual environment. The graphics card can use the received data to generate the first data, e.g., that represents an image of the virtual environment. The first data may be a portion of the visual content, such as the lower or upper half of a frame.

In some examples, generating first data for visual content can include beginning a continuous process of generating data for visual content. The continuous process of generating visual content can be a continuous process of generating data for a single frame. The content generation device can begin generating data for the single frame, for example, by generating data representing portions of the frame. In some examples, the content generation device can begin by generating the data for the upper left portion of the frame. In some examples, the content generation device can begin by generating the data for odd-numbered lines in the frame. The content generation device can proceed sequentially through the frame, generating data for the respective frame portions as the content generation device processes those portions of the frame.

Figure 3:
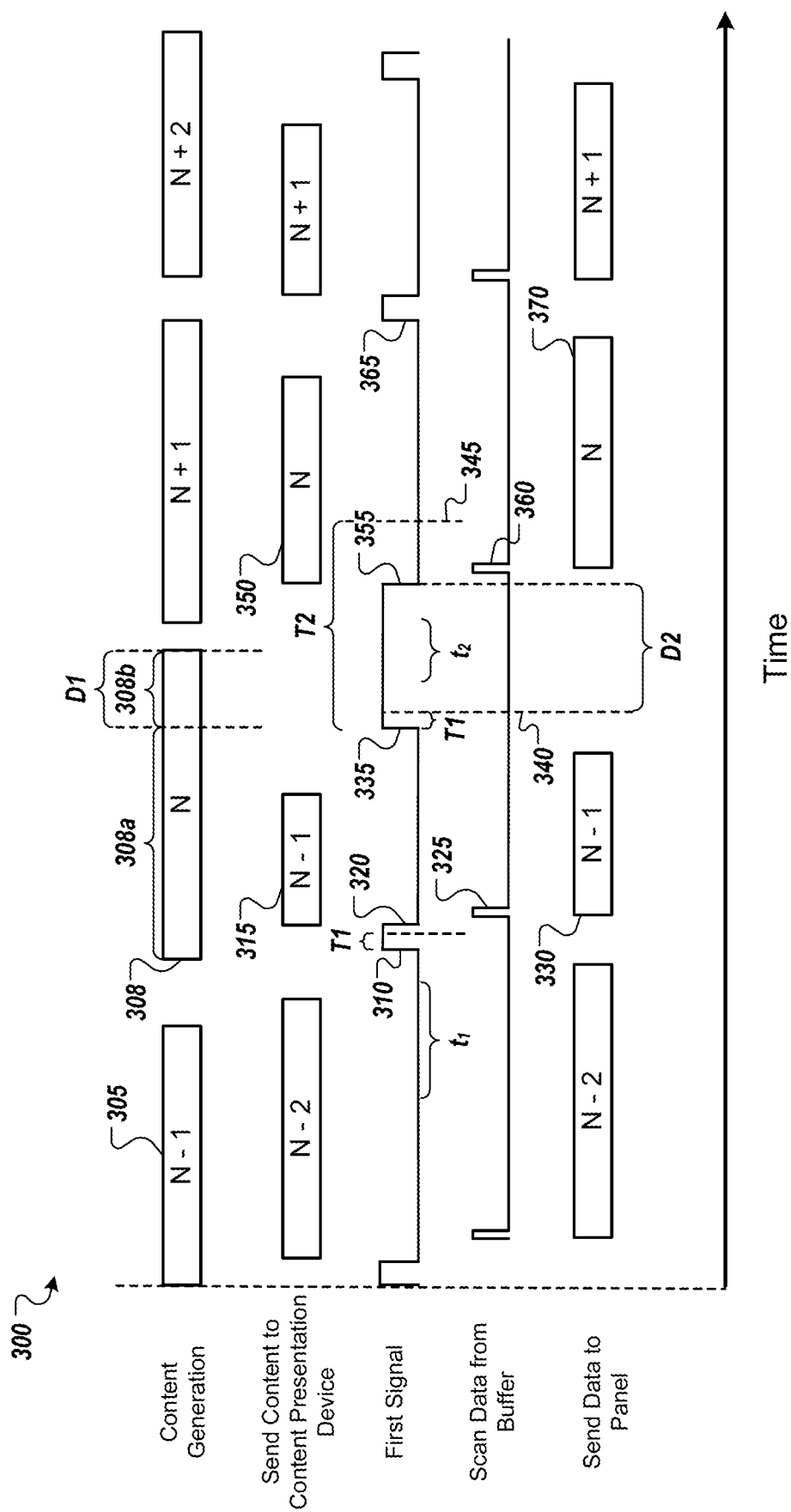
FIG. 3 and FIG. 4 are example timing diagrams that show generation and display of visual content over time.

FIG. 3 is an example timing diagram 300 that shows generation and display of visual content over time. In FIG. 3, the content generation device generates frame N−1 305. During time period $t_1$, when the content generation device completes generation of the frame N−1 305, a content presentation device, e.g., the content presentation device 115, has not yet asserted a first signal.

After time period $t_1$, the content presentation device asserts 310 the first signal for a first time, indicating that the content generation device can send the visual content to a buffer, e.g., the buffer 140. The content presentation device can assert the first signal for at least a minimum threshold duration of time T1, but no longer than a maximum threshold duration of time T2. The minimum threshold duration of time T1 and the maximum threshold duration of time T2 can begin when or approximately when the content presentation device asserts the first signal.

While the first signal is asserted 310, the content generation device can start sending 315 the visual content to the content presentation device. After the minimum threshold duration of time T1, and when the content generation device sends 315 the visual content to the content presentation device, the content presentation device deasserts 320 the first signal. The content presentation device can then scan 325 the visual content from the buffer, and display 330 the visual content on the panel.

After generating frame N−1 305, the content generation device can generate first data 308a for the visual content, e.g., the frame N 308. The first data 308a can be a contiguous portion of the visual content, e.g., an upper or left side of the frame. The first data 308a can include non-contiguous data for the visual content.

In some examples, generating the first data 308a can include beginning a continuous process of generating data for visual content, e.g., a single frame. For example, generating the first data 308a can include generating the data for the upper left portion of the frame, or the odd-numbered lines in the frame, and proceeding sequentially to additional portions of the frame.

Returning to FIG. 2, the content generation device receives, from a content presentation device, a first signal set to a first value indicating that a system can send visual content to a buffer (204). The first signal can be, for example, a TE signal. The first value can be any appropriate value. The first value may indicate that the first signal is asserted. The first value can be, for example, a value of one indicating that the system can send visual content to the buffer. The buffer can be, for example, the buffer 140 from the environment 100. In some examples, the system, e.g., that includes the content generation device, can send visual content to the buffer 140 when the panel driver 145 is not reading data from the buffer 140.

For instance, as shown in FIG. 3, the content presentation device asserts 335 the first signal for a second time. When the content presentation device continuously sends the first signal to the content generation device, the content presentation device can change a value of the first signal, e.g., from a value of zero to a value of one.

Returning to FIG. 2, the content generation device generates second data for visual content (206). The second data for visual content may be another portion of the visual content. For instance, when the first data for the visual content is an upper portion of the visual content, the second data for the visual content can be a lower portion of the visual content. In some examples, the visual content includes only the first data and the second data. The sizes of the first data and the second data can be the same or they can be different. For example, the first data may have a larger size, e.g., in bytes, than the second data.

In some examples, generating second data for visual content can include finishing the continuous process of generating data for visual content, e.g., a single frame. The content generation device can finish generating data for the single frame, for example, by generating data representing portions of the frame. In some examples, the content generation device can finish by generating the data for the lower right portion of the frame. In some examples, the content generation device can finish by generating the data for even-numbered lines in the frame. Once the content generation device finishes generating the second data, the content generation device has generated data for the entire frame.

For instance, in FIG. 3, the content generation device generates second data 308b for the frame N 308. The content generation device generates the second data 308b after the content presentation device sets the first signal to the first value. For example, the content generation device continues to generate data for the frame N 308, e.g., because of the complexity of data for the frame N, such as graphics data for a video game.

Generating the second data 308b can include finishing the continuous process of generating data for visual content, e.g., the single frame. For example, generating the second data 308b can include generating the data for the lower right portion of the frame, or even-numbered lines in the frame. Once the content generation device finishes generating the second data 308b, the content generation device has generated data for the entire frame.

The content generation device may continue to generate the frame N 308 during a delay period with a duration D1. Generation of the frame N 308 continues after the first threshold duration of time T1 expires for the second assertion 335 of the first signal. For instance, when the first threshold duration of time T1 is 10 milliseconds, the content generation device may generate the frame N 308, e.g., the second data 308b, for 50 milliseconds, longer than the first threshold duration of time T1. The content generation device may generate the frame N 308, for example, for 8.33 ms, 11.1 ms. 16.6 ms, 33.3 ms, 41.6 ms, 50 ms, or a longer period of time. Returning to FIG. 2, the content generation device determines if the first signal is still set to the first value, and if a second threshold duration of time has not yet expired (208). For example, the content presentation device can assert the TE signal, e.g., set the TE signal to a value of one, for up to the second threshold duration of time. Upon reaching the second threshold duration of time, the content presentation device can deassert the TE signal, e.g., set the TE signal to a value of zero.

For instance, in FIG. 3, the content presentation device asserts 335 the first signal for at least the first threshold duration of time T1. Upon reaching the expiration 340 of the first threshold duration of time T1, the content generation device is not yet sending 350 frame N 308 to the content presentation device, due to the continued generation of the frame N 308 during the delay period of time D1. The first signal can remain asserted at most until reaching the expiration 345 of the second threshold duration of time T2.

During time $t_2$, when the content generation device completes generation of the frame N 308, the content generation device can determine the status of the first signal. For instance, the content generation device can determine whether the content presentation device has asserted 335 a first signal, and the second threshold duration of time T2 has not expired 345.

Returning to FIG. 2, in response to determining that the first signal is set to the first value and that the second threshold period of time has not expired, the content generation device can send, to the content presentation device, the visual content (210). For instance, the content generation device can retrieve the visual content, that includes both the first data and the second data, from a memory included in the content generation device. The content generation device can send the visual content to the content presentation device for storage in a buffer.

For example, in FIG. 3, in response to determining that the content presentation device has asserted 335 a first signal, and the second threshold duration of time T2 has not expired 345, the content generation device sends 350 the visual content to the content presentation device.

Returning to FIG. 2, the content generation device can receive, from the content presentation device, the first signal set to the second value (212). In some implementations, sending the visual content from the content generation device to the content presentation device causes the content presentation device to change the first signal from the first value to the second value.

For example, the TE signal can be set to a value of zero when the buffer, e.g., in the content presentation device, receives the visual content. In some examples, the content presentation device sets the first signal to the second value and sends the first signal set to the second value to the content generation device, e.g., when the content presentation device does not send a continuous first signal to the content generation device. The content presentation device can set the first signal to the second value before the content presentation device begins to store the visual content in the buffer, concurrently with beginning to store the visual content in the buffer, or after beginning to store the visual content in the buffer.

For example, in FIG. 3, the content generation device sending 350 the visual content to the content presentation device can trigger the content presentation device to deassert 355 the first signal. The content generation device receives, from the content presentation device, the first signal set to the second value.

A panel driver or another component of the content presentation device can then scan 360 the visual content from the buffer and send 370 the visual content to display on the panel. For instance, the panel driver can use the visual content from the buffer to display an image on the panel. When the visual content includes values that represent pixel locations and colors for the respective pixel locations, the panel driver can use the visual content to display the appropriate colors at the respective pixel locations.

The process 200, e.g., step 208, can improve the performance of visual display systems when the content generation rate is between the display panel's maximum and minimum refresh rate. For instance, use of the first signal set to either the first value or the second value, use of the second threshold duration of time, or both, can improve a visual display system's performance.

For example, in FIG. 3, after the content generation device generates content during the delay period D1, the content generation device begins to send 350 frame N 308 to the content presentation device. Sending the visual content causes the content presentation device to deassert 355 the first signal. The delay period D1 in generating frame N results in a delay period D2 in scanning 360 frame N from the buffer. Although there is a delay in displaying frame N, frame N can display in sequence after frame N−1, e.g., with no frames repeating and no frames skipped.

Returning to FIG. 2, in response to determining that the first signal is not set to the first value or the second threshold period of time has expired or both, the content generation device can determine to wait to send the visual content to the content presentation device (214). For example, after performing step 208, the content generation device can determine to wait until the first signal is set to the first value before sending the visual content. The content generation device can perform the determination after finishing the continuous process of generating data for the visual content, e.g., after generating data for the entire frame.

In some implementations, the content generation device can determine whether to wait. The content generation device may determine whether to wait based on a minimum refresh rate. For instance, the content generation device may determine to not wait in order to maintain a minimum refresh rate. The content generation device may determine to wait based on a determination that a minimum refresh rate will be maintained despite waiting to send the visual content to the content presentation device. When determining not to wait, the content generation device may write to a buffer while the content presentation device is reading from the buffer, e.g., as described in this document.

For example, in FIG. 3, when the content generation device completes generation of the frame N−1 305, the content generation device determines that the first signal is not set to the first value. The content generation device can determine to wait to send 315 the visual content to the content presentation device until the content presentation device asserts 310 the first signal for the first time.

In another example, the content generation device may complete generation of frame N 308 and determine that the second threshold period of time T2 has expired 345. The content generation device can determine to wait to send 350 the visual content to the content presentation device until the content presentation device asserts 365 the first signal for a third time, e.g., the second time the first signal would be asserted for the frame N 308 and the third time the first signal would be asserted with respect to the example described with reference to FIG. 3. If the content generation device completes the generation of visual content after the expiration of the second threshold period of time T2, the content generation rate may be below the display panel's minimum refresh rate.

The process 200 can optionally offer several approaches to handle cases when content generation rate falls below a display panel's minimum refresh rate. A content generation rate falling below a display panel's minimum refresh rate can indicate that a new content frame is still rendering when the first signal reaches its second threshold duration of time T2.

In some examples, the content generation device can determine to send visual content, e.g., determine not to wait to send the visual content to the presentation device and not to perform step 214. For example, after performing step 208, and determining that the first signal is not still set to the first value, the second threshold duration of time T2 has expired, or both, the content generation device can determine to send the visual content to the content presentation device immediately while avoiding overtaking the content presentation device's read location on the buffer. The content generation device may determine to send, e.g., not to wait to send, the visual content to the presentation device, for example, if the content generation rate falls below the display panel's minimum refresh rate.

When the content generation rate falls below the panel's minimum refresh rate, a system might drop a frame and catch up with the next content frame. In this case, the first frame is shown for longer than intended and the second frame is dropped, both causing a one-time jank. The rendering rate can recover with the third frame. When the second frame is dropped, it is not guaranteed that the third frame will render in time for the next first signal assertion. In this case, the first frame can be forced to be shown a third time. This case can be common in more graphically complex use cases, such as video games.

Figure 4:
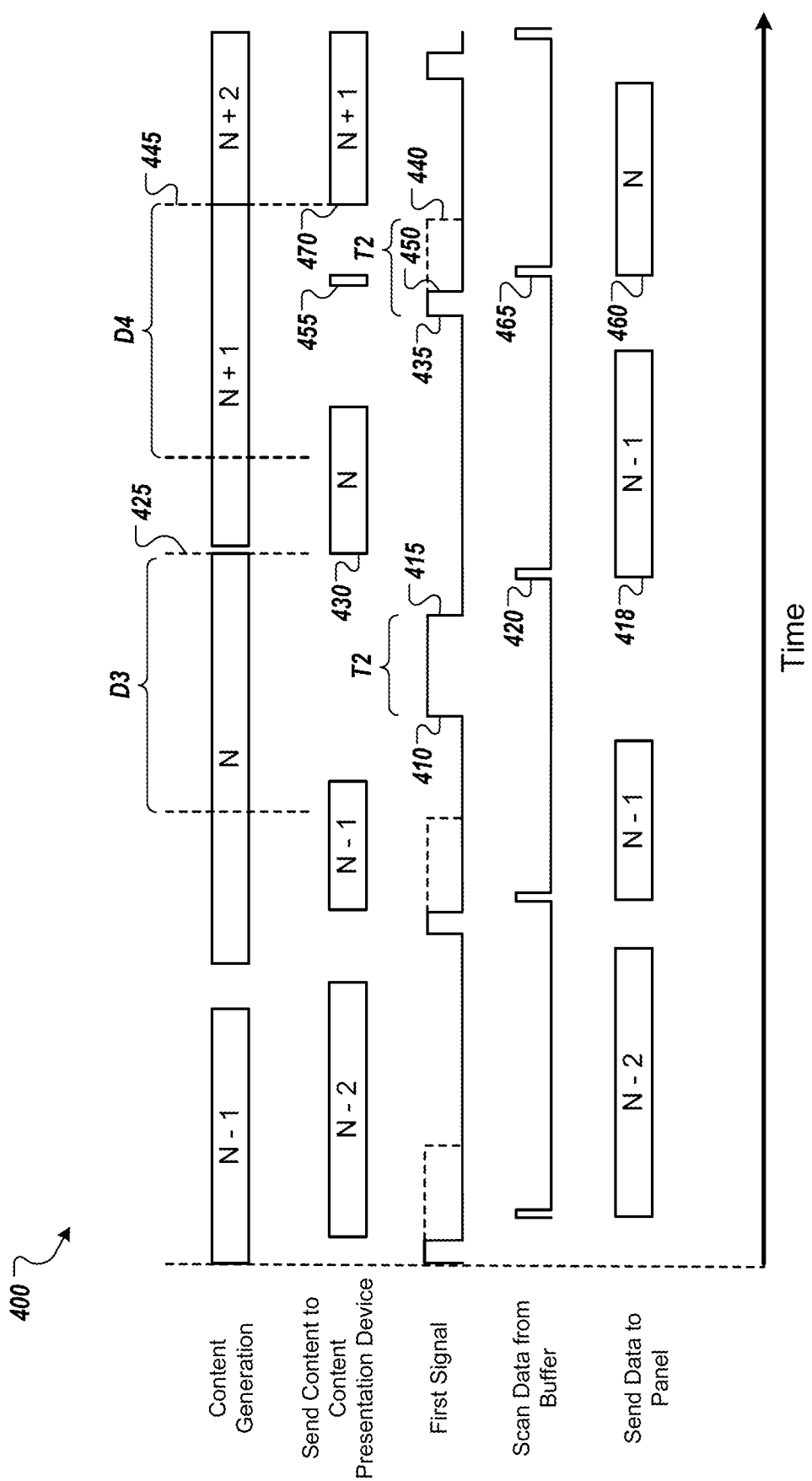

FIG. 4 is another example timing diagram 400 that shows the generation and display of visual content over time. In FIG. 4, a content generation device may have a content generation rate below a display panel's minimum refresh rate.

To improve performance when the content generation rate falls below the display panel's minimum refresh rate, the content generation device can send visual content to the content presentation device even after the second threshold duration of time T2 has expired while asserting the first signal 410 for a first time. This can result in one of two possible outcomes. In a first outcome, frame N+1 completes generation before the content presentation device asserts the first signal 435 for a second time. Frame N+1 overwrites frame N, and frame N+1 is displayed. In a second outcome, frame N+1 does not complete generation before the content presentation device asserts the first signal 435 for a second time. Frame N is displayed, reducing the amount of extra time N-1 is displayed. In both cases, the latest available content frame can be shown as soon as possible.

In conjunction with either of the two above outcomes, the content generation device can wait for the panel driver to begin reading the visual content data from the buffer before sending the visual content to the content presentation device when sending visual content to the content presentation device while the first signal is deasserted, e.g., and the content presentation device is reading content from the buffer. For instance, the content generation device can write to the buffer just behind where the content generation device is reading from the buffer. This can ensure that content generation device writes into the buffer do not overrun content presentation device reads from the buffer.

The content generation device can capture a CPU-accessible timestamp when the first signal deasserts. The content generation device can reference the timestamp to infer when it is safe to write to the buffer while the first signal is deasserted. The content generation device can determine, based on the timestamp, that the content presentation device is not accessing or about to access the buffer or a portion of the buffer to which the content generation device will write. In response to determining that the content presentation device is not accessing or about to access the buffer, the content generation device can send visual content to the content presentation device even though the first signal is not asserted. The content presentation device allows the content generation device to write to the buffer normally in this case.

For example, in FIG. 4, the content generation device continues to generate frame N for a delay period of time D3. During the generation of frame N, the content presentation device asserts the first signal 410. When the second threshold duration of time T2 expires, the content presentation device deasserts 415 the first signal. The content generation device determines a timestamp, e.g., received from the content presentation device or generated internally based on deassertion 415 of the first signal, indicating the deassertion 415 of the first signal. The deassertion 415 of the first signal indicates that the content presentation device is scanning 420 or about to scan frame N-1 from the buffer to the display. Because the content generation device continues to generate the frame N after the content presentation device deasserts 415 the first signal and there is no new visual content to read from the buffer, the content presentation device repeats display 418 of the frame N-1 on the panel.

The content generation device completes 425 generation of frame N after the second threshold duration of time T2 expires. Although the first signal is deasserted 415, the content generation device can determine, based on the timestamp for the deassertion 415 of the first signal, that the content presentation device is not accessing or about to access the buffer. In some examples, the content generation device may determine that the content presentation device has already begun to access the buffer but that the content generation device can store data in the buffer behind where the content presentation device is reading. In response to either or both of these determinations, the content generation device can send 430 frame N to the content presentation device even though the first signal is not asserted.

Returning to FIG. 2, the content generation device can optionally send a message that causes the content presentation device to read visual content stored in the buffer (216). The message can cause the content presentation device to read the content stored in the buffer or begin a new refresh cycle, instead of waiting to read content from the buffer or waiting to begin a refresh cycle. The content presentation device can then present, using the read visual content, an image on a display.

The content presentation device may optionally determine to send the message to read visual content stored in the buffer, for example, based on the amount of time required for generating the first data for visual content (202) and the second data for visual content (206).

For example, FIG. 4 includes a message 455 separate from the visual content. For example, the message 455 can be a write_memory_start command, which is typically sent before sending visual content. The write_memory_start command triggers the content presentation device to begin a refresh cycle. The write_memory_start command causes the content presentation device to scan the current buffer contents to the display panel, even if the content generation device is not ready to send new data.

The content generation device continues to generate frame N+1 for a delay period of time D4. The content generation device recognizes that the generation of frame N+1 is delayed, and that the second threshold duration of time T2 for the first signal will expire 440 before the generation of frame N+1 completes. Based on the amount of time required for generating the frame N+1, the content generation device can optionally determine to send the message 455 without subsequent visual content. When the content generation device sends the message 455 to the content presentation device, the content presentation device deasserts 450 the first signal before the second threshold duration of time T2 expires 440. Receipt of the message 455 by the content presentation device can also cause the content presentation device to scan 465 the buffer content for display 460 on the display panel.

When the content presentation device scans 465 the buffer content to the display panel, frame N displays 460 on the display panel. The content presentation device displays 460 frame N while waiting for frame N+1 to complete generation 445, and before the expiration 440 of the second threshold duration of time T2.

By sending the message 455, the content generation device increases the speed at which frame N is displayed, e.g., so that the content presentation device does not have to wait until expiration 440 of the second threshold duration of time T2. By sending the message 455, the content generation device can enable the content presentation device to display the frames in order. If the content generation device does not send the message 455, frame N might be dropped, such that the frame N+1 would display immediately after frame N−1. In this way, sending the message 455 to trigger reading of current data out of the buffer can reduce latency to display 460 frame N, enable display 460 of frame N, or both. Sending the message 455 can also reduce jank due to frame N−1 remaining on screen for longer than expected.

After sending the message 455, the content generation device completes generation of frame N+1, and determines that at least a threshold duration of time has passed since sending the message 455. The content generation device may determine the threshold duration of time based on the timestamp. In response to determining that at least a threshold duration of time has passed since sending the message 455, the content generation device sends 470, to the content presentation device, frame N+1. The content presentation device can send 470 frame N+1 to the content presentation device while the first signal is set to the second value.

In some examples, after sending the message 455, the content generation device completes generation of frame N+1, and determines that the first signal is asserted. In response to determining that the first signal is asserted, the content generation device sends 470, to the content presentation device, frame N+1.

The order of steps in the process 200 described above is illustrative only, and can be performed in different orders. For example, the content generation device may receive the first signal set to the second value (step 212) before sending the visual content to the content generation device (step 210). This may occur, for example, if the second threshold duration of time is reached. In these examples, the content generation device could perform step 212, perform step 208, determine that the threshold duration of time has expired, perform step 214, and then perform step 210.

In some examples, the content generation device might not determine to wait to send the visual content to the content presentation device (214). For instance, the content generation device may perform steps 202 through 208 and 216 without performing step 214. The content generation device may send the visual content to the content presentation device while the signal is deasserted, if the display driver is not reading out of the buffer at the time.

In some implementations, the process 200 can include additional steps, fewer steps, or some of the steps can be divided into multiple steps. For example, the content generation device might not send a message that causes the content presentation device to read visual content stored in the buffer (216). Rather, the content generation device may wait for the next assertion of the first signal to send visual content to the content presentation device. In some examples, the process 200 does not include one or more of steps 212, 214, or 216.

The content generation device can begin generating data for the visual content at any appropriate time. For example, the content generation device can begin to generate the visual content, e.g., generate the first data for the visual content, before receiving the first signal set to a first value, e.g., before a tearing effect signal is asserted. In some examples, the content generation device can begin generating the visual content, e.g., generate the first data for the visual content, after receiving the first signal set to the first value. In these examples, the content generation device may generate all data for the visual content while the first signal is set to the first value, e.g., during a time period in which a tearing effect signal remains asserted and before it is deasserted.

When the content generation device begins generating the visual content after receiving the first signal set to the first value, the content generation device can perform as described above. For instance, if the content generation device finishes generating the visual content, e.g., the second data, while the first signal is set to the first value and before the second threshold duration of time has expired, the content generation device can perform step 210, e.g., send the visual content to the content presentation device. If the content generation devices finishes generating the visual content, e.g., the second data, when the first signal is set to the second value, after the second threshold duration of time expires, or both, then the content generation device can perform step 214, e.g., determine to wait to send the visual content to the content presentation device.

In some implementations, the content generation device may perform two steps instead of the single step 208. For instance, the content generation device may determine whether the first signal is still set to the first value. If the first signal is not set to the first value, the content generation device can perform step 214. If the first signal is set to the first value, the content generation device may determine whether the threshold duration of time has not yet expired. If the threshold period of time has expired, the content generation device can perform step 214. If the threshold period of time has not expired, the content generation device can perform step 210.

Some computing devices, such as mobile computing devices, use OLED displays. OLED displays can illuminate individual pixels by emitting emission pulses at a regular rate. In an OLED panel, emission pulse sequences can be spread evenly across a period of time to generate a steady level of luminance, e.g., there is a predetermined amount of time between each sequential emission pulse. When emission pulse sequences are not spread evenly across a period of time, the luminance of the OLED panel may vary, causing portions of the OLED panel to get darker, change color, or both.

When the refresh rate is varied in OLED displays, fluctuations in display brightness may occur, e.g., if the emission pulse rate also varies. For instance, as refresh cycles stretched unpredictably, the time at which the emission pulses occur may be unknown. In particular, if emission pulses are spread across uneven refresh cycles, there can be fluctuations in brightness of an OLED display and from content frame to content frame presented on the OLED display. Similarly, interrupted emission pulses can cause inconsistent OLED display and frame to frame brightness.

To prevent uneven time periods between emission pulses, a content presentation device can delay a refresh cycle until an ongoing emission pulse ends to maintain emission pulses at even time periods, e.g., regular rates. For example, the content presentation device can be configured to pulse emission pulses regularly and continuously, even when a first signal assertion is extended. This can synchronize the refresh rate with the emission pulses in order to maintain consistent luminance of the OLED display and to minimize fluctuations in brightness.

If an emission pulse is in progress when the content presentation device is ready to start a new refresh cycle, the content presentation device can wait for the emission pulse to end before beginning the new refresh cycle, so that it does not interrupt the emission pulse. For example, when the content presentation device receives new visual content for the buffer, or determines that a duration of the first signal being asserted satisfies a second threshold duration of time, the content presentation device can determine to wait before beginning a new refresh cycle. The content presentation does not begin a new refresh cycle until the emission pulse ends.

Figure 5:
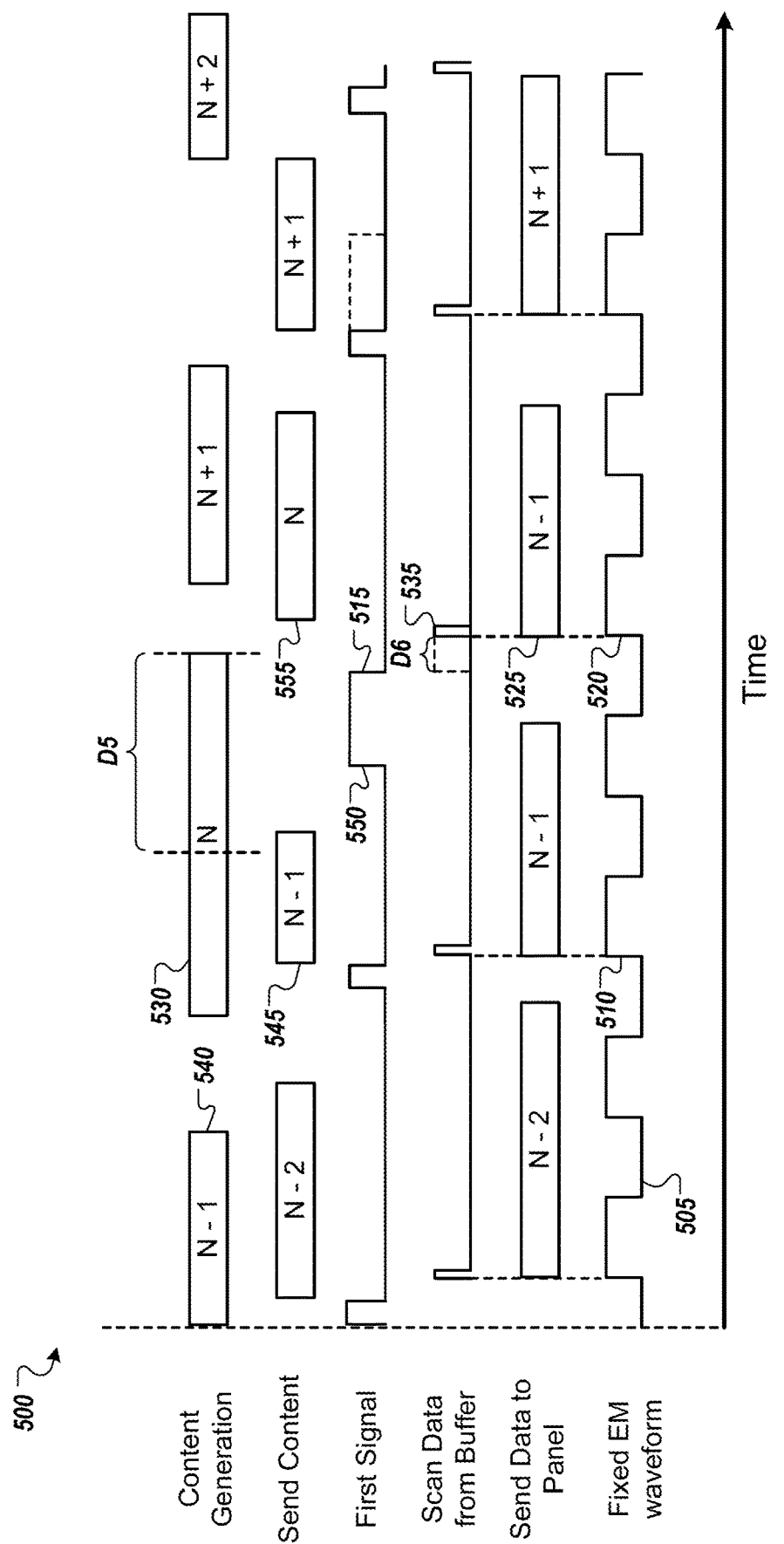
FIG. 5 is an example timing diagram showing the generation and display of visual content over time for displays that use emission pulses.

FIG. 5 is another example timing diagram 500 showing the generation and display of visual content over time for displays that use emission pulses. In FIG. 5, the content presentation device maintains a continuous, regular emission pulse 505. To maintain this continuous, regular emission pulse 505 rate, the content generation device begins each refresh cycle, and scans each frame to the panel, at the start 510 of an emission pulse.

For example, when the content generation device completes the generation of frame N−1 540, the content generation device sends 545 the frame N−1 to the content presentation device prior to start 510 of the emission pulse of the display, for presentation on the display concurrently with the start 510 of the emission pulse.

The content generation device may then generate a frame N 530. Generation of the frame N 530 is delayed by a period of time D5, e.g., because of a complexity of the content depicted in the frame N 530, such as content for a visually complex video game. While the content generation device generates the frame N 530, the content presentation device asserts 550 the first signal. Due to the delay D5 in generating the frame N 530, the first signal reaches its second threshold duration of time, and the content presentation device deasserts 515 the first signal before the content presentation device completes the generation of frame N 530.

When the content presentation device deasserts 515 the first signal, the content presentation device does not necessarily scan the visual content to the display panel immediately. Rather, the content presentation device waits for a period of time D6, because the emission waveform is in between emission pulses. The content presentation device then scans 535 the visual content to display 525 on the panel in synchronization with the beginning 520 of the next emission pulse. The panel displays 525 frame N−1 for a second time, since the content generation device has not yet sent 555 frame N 530 to the content presentation device.

In some implementations, the emission pulses are configured to be short, in order to minimize the delay due to an ongoing emission pulse when a new refresh cycle is ready to start. For example, emission pulses can be shorter than 1 millisecond in duration.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HyperText Markup Language (HTML) page, to a user device, e.g., for purposes of displaying data to and receiving user input from a user interacting with the user device, which acts as a client. Data generated at the user device, e.g., a result of the user interaction, can be received from the user device at the server.

Figure 6:
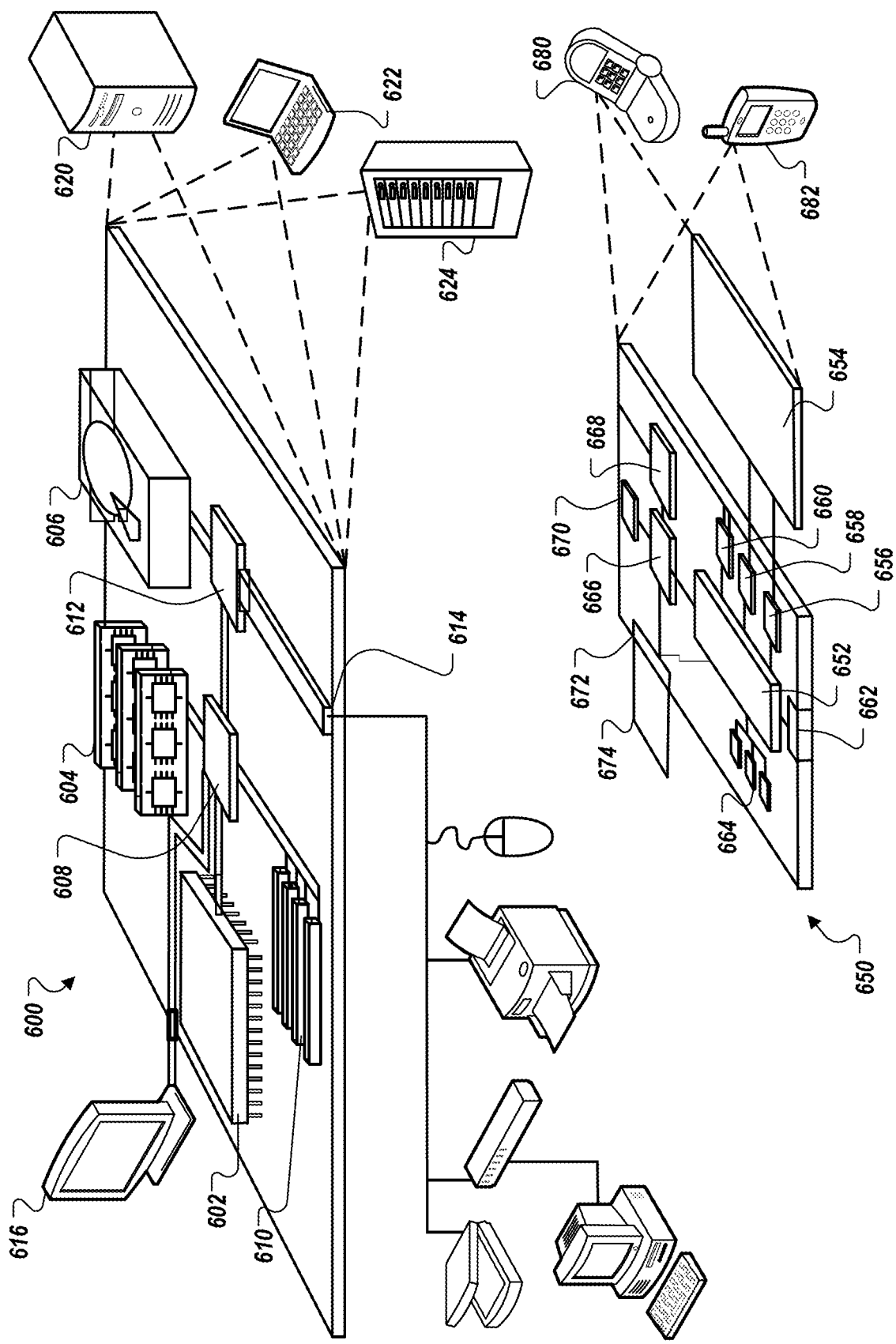
FIG. 6 is a block diagram of a computing system that can be used in connection with computer-implemented methods described in this document.

FIG. 6 is a block diagram of computing devices 600, 650 that may be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a computer-readable medium. In one implementation, the memory 604 is a volatile memory unit or units. In another implementation, the memory 604 is a non-volatile memory unit or units.

The storage device 606 is capable of providing mass storage for the computing device 600. In one implementation, the storage device 606 is a computer-readable medium. In various different implementations, the storage device 606 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can process instructions for execution within the computing device 650, including instructions stored in the memory 664. The processor may also include separate analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD display or an OLED display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provided in communication with processor 652, so as to enable near area communication of device 650 with other devices. External interface 662 may provide, for example, for wired communication (e.g., via a docking procedure) or for wireless communication (e.g., via Bluetooth or other such technologies).

The memory 664 stores information within the computing device 650. In one implementation, the memory 664 is a computer-readable medium. In one implementation, the memory 664 is a volatile memory unit or units. In another implementation, the memory 664 is a non-volatile memory unit or units. Expansion memory 674 may also be provided and connected to device 650 through expansion interface 672, which may include, for example, a SIMM card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provided as a security module for device 650, and may be programmed with instructions that permit secure use of device 650. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS receiver module 670 may provide additional wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for varying a refresh rate of an electronic display, comprising:
    setting, by display driver circuitry at a first time, a signal provided by the display driver circuitry to a content generation device to a first value, to prompt the content generation device to send first visual content to the display driver circuitry;
    receiving, by the display driver circuitry, a first message from the content generation device; and
    changing, by the display driver circuitry at a second time, the signal from the first value to a second value in response to the display driver circuitry having received the first message from the content generation device, the second value indicating that the display driver circuitry is not ready to receive visual content, the second time being a first duration after the first time;
    setting, by the display driver circuitry at a third time, the signal provided by the display driver circuitry to the content generation device to the first value, to prompt the content generation device to send second visual content to the display driver circuitry;
    receiving, by the display driver circuitry, a second message from the content generation device; and
    changing, by the display driver circuitry at a fourth time, the signal from the first value to the second value in response to the display driver circuitry having received the message from the content generation device, the fourth time being a second duration after the third time, wherein the second duration is different from the first duration.

2. The method of claim 1, wherein the display driver circuitry is configured, after having set the signal to the first value, to set the signal to the second value upon reaching a threshold duration of time, had the display driver circuitry not received the first message from the content generation device.

3. The method of claim 2, wherein the threshold duration of time is based on a minimum refresh rate of the electronic display.

4. The method of claim 2, wherein the second duration is greater than the first duration.

5. The method of claim 1, wherein the first message includes visual content, the method comprising:
    in response to receiving the first message that includes visual content, storing the visual content in a buffer of the display driver circuitry.

6. The method of claim 5, comprising:
    after changing the signal from the first value to the second value, reading the stored visual content from the buffer to present an image on the electronic display.

7. The method of claim 1, wherein the first message does not include visual content, the method comprising:
    in response to receiving the message that does not include visual content, reading previously stored visual content from a buffer of the display driver circuitry to present an image on the electronic display.

8. The method of claim 1, wherein the visual content represents a frame in a video stream.

9. The method of claim 1, wherein the signal being set to the first value indicates that the display driver circuitry is ready to receive visual content.

10. The method of claim 1, wherein the display driver circuitry setting the signal to the first value causes the content generation device to send the message to the display driver circuitry.

11. The method of claim 1, wherein emission pulses of the electronic display occur at predetermined time intervals, the method comprising:
    receiving the first message from the content generation device before a start of an emission pulse of the electronic display, wherein the first message includes visual content; and
    presenting the visual content on the electronic display concurrently with the start of the emission pulse.

12. The method of claim 11, wherein the predetermined time intervals are each one millisecond or less.

13. The method of claim 1, wherein the signal is a tearing effect signal.

14. A system comprising one or more computers and one or more storage devices on which are stored instructions that are operable, when executed by the one or more computers, to cause the one or more computers to perform operations comprising:
    setting, by display driver circuitry at a first time, a signal provided by the display driver circuitry to a content generation device to a first value, to prompt the content generation device to send first visual content to the display driver circuitry;

receiving, by the display driver circuitry, a first message from the content generation device; and changing, by the display driver circuitry at a second time, the signal from the first value to a second value in response to the display driver circuitry having received the message from the content generation device, the second value indicating that the display driver circuitry is not ready to receive visual content, the second time being a first duration after the first time;

setting, by the display driver circuitry at a third time, the signal provided by the display driver circuitry to the content generation device to the first value, to prompt the content generation device to send second visual content to the display driver circuitry;

receiving, by the display driver circuitry, a second message from the content generation device; and changing, by the display driver circuitry at a fourth time, the signal from the first value to the second value in response to the display driver circuitry having received the message from the content generation device, the fourth time being a second duration after the third time, wherein the second duration is different from the first duration.

15. The system of claim 14, wherein the display driver circuitry is configured, after having set the signal to the first value, to set the signal to the second value upon reaching a threshold duration of time, had the display driver circuitry not received the first message from the content generation device.

16. The system of claim 14, wherein the first message includes visual content, the operations comprising:

in response to receiving the first message that includes visual content, storing the visual content in a buffer of the display driver circuitry.

17. The system of claim 16, the operations comprising:

after changing the signal from the first value to the second value, reading the stored visual content from the buffer to present an image on an electronic display.

18. The system of claim 14, wherein the first message does not include visual content, the operations comprising:

in response to receiving the message that does not include visual content, reading previously stored visual content from a buffer of the display driver circuitry to present an image on an electronic display.

19. A non-transitory computer storage medium encoded with instructions that, when executed by one or more computers, cause the one or more computers to perform operations comprising:

setting, by display driver circuitry at a first time, a signal provided by the display driver circuitry to a content generation device to a first value, to prompt the content generation device to send first visual content to the display driver circuitry;

receiving, by the display driver circuitry, a first message from the content generation device; and changing, by the display driver circuitry at a second time, the signal from the first value to a second value in response to the display driver circuitry having received the message from the content generation device, the second value indicating that the display driver circuitry is not ready to receive visual content, the second time being a first duration after the first time;

setting, by the display driver circuitry at a third time, the signal provided by the display driver circuitry to the content generation device to the first value, to prompt the content generation device to send second visual content to the display driver circuitry;

receiving, by the display driver circuitry, a second message from the content generation device; and changing, by the display driver circuitry at a fourth time, the signal from the first value to the second value in response to the display driver circuitry having received the message from the content generation device, the fourth time being a second duration after the third time, wherein the second duration is different from the first duration.

20. A computer-implemented method for varying a refresh rate of an electronic display, comprising:

setting, by display driver circuitry, a signal provided by the display driver circuitry to a content generation device to a first value, to prompt the content generation device to send visual content to the display driver circuitry;

receiving, by the display driver circuitry after a first threshold duration of time has passed, a message from the content generation device; and changing, by the display driver circuitry, the signal from the first value to a second value in response to the display driver circuitry having received the message from the content generation device, the second value indicating that the display driver circuitry is not ready to receive visual content, wherein a time between the first threshold duration of time and a time of the signal changing from the first value to the second value comprises a time delay of a refresh cycle of the electronic display.

21. A computer-implemented method for varying a refresh rate of an electronic display, wherein emission pulses of the electronic display occur at predetermined time intervals of one millisecond or less, the method comprising:

setting, by display driver circuitry, a signal provided by the display driver circuitry to a content generation device to a first value, to prompt the content generation device to send visual content to the display driver circuitry;

receiving, by the display driver circuitry after a first threshold duration of time has passed and before a start of an emission pulse of the electronic display, a message from the content generation device, wherein the message includes the visual content;

changing, by the display driver circuitry, the signal from the first value to a second value in response to the display driver circuitry having received the message from the content generation device, the second value indicating that the display driver circuitry is not ready to receive additional visual content; and presenting the visual content on the electronic display concurrently with the start of the emission pulse.

* * * * *